United States Patent
Komatsu

(10) Patent No.: US 7,148,883 B2
(45) Date of Patent: Dec. 12, 2006

(54) INFORMATION RECORDING AND REPRODUCING APPARATUS

(75) Inventor: Yoshiaki Komatsu, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 645 days.

(21) Appl. No.: 09/819,920

(22) Filed: Mar. 29, 2001

(65) Prior Publication Data

US 2001/0047215 A1 Nov. 29, 2001

(30) Foreign Application Priority Data

May 29, 2000 (JP) ............................. 2000-158309

(51) Int. Cl.
G09G 3/28 (2006.01)
G06K 11/06 (2006.01)

(52) U.S. Cl. .................................. 345/182; 178/18.01

(58) Field of Classification Search ................ 345/302, 345/330, 333, 389, 704, 764, 769, 822, 863, 345/173–183; 178/18.01, 19.01, 174, 18.03; 715/500.1

See application file for complete search history.

(56) References Cited

U.S. PATENT DOCUMENTS

| | | | |
|---|---|---|---|
| 5,136,125 A | | 8/1992 | Russel |
| 5,818,436 A * | 10/1998 | Imai et al. ................ 715/500.1 |
| 6,320,601 B1 * | 11/2001 | Takasu et al. ............... 345/764 |
| 6,327,423 B1 * | 12/2001 | Ejima et al. .................. 386/96 |
| 6,353,193 B1 * | 3/2002 | Atwood et al. .......... 178/20.02 |
| 6,522,347 B1 * | 2/2003 | Tsuji et al. .................. 345/848 |
| 6,529,920 B1 * | 3/2003 | Arons et al. ............. 715/500.1 |
| 6,563,491 B1 * | 5/2003 | Omura ....................... 345/173 |
| 6,689,965 B1 * | 2/2004 | Fleck ....................... 178/18.01 |
| 6,756,972 B1 * | 6/2004 | Komatsu et al. ............ 345/173 |

FOREIGN PATENT DOCUMENTS

| JP | 7-13688 A | 1/1995 |
|---|---|---|
| JP | 7-73192 A | 3/1995 |
| JP | 7-78052 A | 3/1995 |

OTHER PUBLICATIONS

U.S. Appl. No. 09/636,818, filed Aug. 10, 2000, Okamoto et al.
U.S. Appl. No. 09/666,892, filed Sep. 20, 2000, Wakayama et al.
U.S. Appl. No. 09/659,754, filed Sep. 11, 2000, Tomomatsu et al.
U.S. Appl. No. 09/628,724, filed Jul. 28, 2000, Nagai et al.
U.S. Appl. No. 09/634,322, filed Aug. 7, 2000, Nagai et al.
U.S. Patent Application; filed Mar. 29, 2001; Komatsu.

* cited by examiner

*Primary Examiner*—Richard Hjerpe
*Assistant Examiner*—Kevin M. Nguyen
(74) *Attorney, Agent, or Firm*—Oliff & Berridge, PLC

(57) ABSTRACT

When a point on a tablet is designated by a marker, a recording indication signal is on, and recording of sound data is started. When the marker is released from the tablet, the recording indication signal is off, the recording of the sound data is finished, and coordinate data of the point and the sound data are linked. When information, such as characters, is inputted on the tablet using the marker, coordinate data based on the input and the sound data are linked through the coordinate data of the point. When the information such as characters is designated using a marker for playback, the sound data is played back.

12 Claims, 9 Drawing Sheets

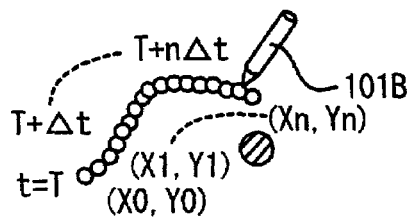
Fig.6A
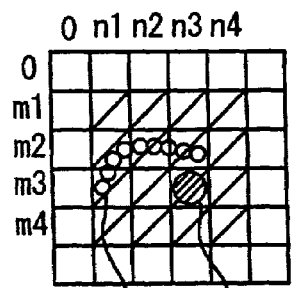
Fig.6C
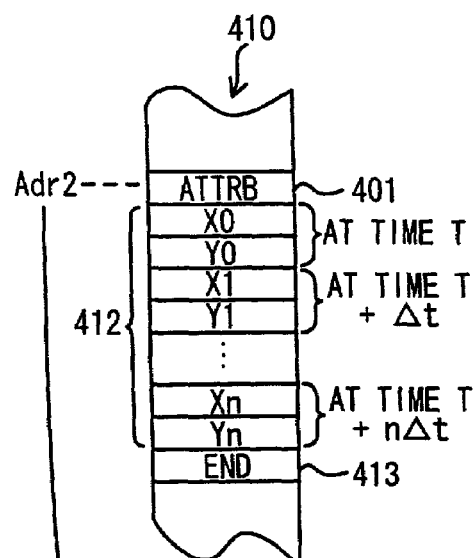
Fig.6B
Fig.6D
Fig.6E

INFORMATION RECORDING AND REPRODUCING APPARATUS

BACKGROUND OF THE INVENTION

1. Field of the Invention

The invention relates to an information recording and reproducing apparatus capable of recording sound information and stroke information and reproducing the sound information.

2. Description of the Related Art

There are related art apparatuses that continuously record and reproduce sounds and voices issued at a meeting conventional apparatuses are capable of recording sounds and voices continuously, storing notes as handwritten data, and playing back corresponding recorded sounds and voices later by designating the handwritten data.

For example, U.S. Pat. No. 5,818,436 corresponding to Japanese Laid-Open Patent Publication No. 6-343146 discloses an apparatus that plays back sound synchronized with handwritten data for a fixed period of time by clicking on the handwritten data.

However, such an apparatus is intended to record sounds and voices continuously for a long time, and cannot record a specific portion only of the sounds and voices for a predetermined short time. In the apparatus, recording is executed from the time when the telephone is off-hook to the time when the telephone, for example, is on-hook. Further, the apparatus cannot record a specific portion only of the sounds and voices for a predetermined short time.

Japanese Laid-Open Patent Publications Nos. 7-13688, 7-73192, and 7-78052, disclose an example that an image of a timer command to start a recording is drawn on a sheet, the image is recognized, and the recording is started. Further, to end the recording, an image of a timer command is drawn on the sheet, and the image is recognized, then the recording is ended.

However, according to such an example, a user has to draw the image of the timer command, having to keep a person on the other end of the telephone waiting while drawing the image. In addition, the image is left on the sheet meaninglessly.

SUMMARY OF THE INVENTION

The invention provides an information recording and reproducing apparatus that can start recording sound or voice easily without the need for leaving the image of the timer command on the sheet meaninglessly, and a storage medium where an information recording and reproducing program is stored.

In an aspect of the invention, an information recording and reproducing apparatus comprising a recording mode selecting device that includes a recording position designating portion for designating a certain position on a predetermined area and a switch that outputs a recording start signal and a recording end signal of sound data by switching of the switch; a coordinate data detecting device that detects coordinate data of a position designated by the position designating portion; a designated coordinate data storing device that stores the coordinate data detected by the coordinate data detecting device as designated coordinate data; and a sound data storing device that starts recording the sound data in response to an output of the recording start signal, ends recording in response to an output of the recording end signal, and stores the designated coordinate data in association with the sound data.

During a talk at a meeting or on the phone, for example, when a user designates a certain position on a predetermined area of an input board using the recording position designating portion of the recording mode selecting device and switches the switch of the recording mode selecting device, a recording start signal is outputted from the recording mode selecting device. When the recording start signal is detected by the coordinate data detecting device, coordinate data of a position designated by the recording position designating portion is detected by the coordinate data detecting device. The coordinate data detected in this manner is stored as designated coordinate data by the designated coordinate data storing device. On the other hand, when the recording start signal is detected, the sound data storing device starts recording the sound data. At this time, the designated coordinate data is associated with the sound data. When the user switches the switch of the recording mode selecting device, a recording end signal is outputted from the recording mode selecting device. In response to an output of the recording end signal, the sound data storing device ends the recording. Therefore, the recording of the sound data can be started and ended with a simple operation, and remaining of meaningless written information can be prevented. Further, as the designated coordinate data and the sound data are stored in association with each other, searching of the sound data after a long interval can be smoothly made.

In another aspect of the invention, the information recording and reproducing apparatus may further comprise a written information inputting device that includes a input position designating portion for inputting written information by designating a certain position on a predetermined area, and a written information storing device that stores the coordinate data detected by the coordinate data detecting device as stroke data, and stores the stroke data and the sound data in association with each other via the designated coordinate data.

Recording of the sound data and the designated coordinate data is executed as described above. Suppose the user inputs written information by designating a position which is identical with or close to the position designated by the recording position designating portion of the recording status switching device, using the input position designating portion of the written information inputting device. Coordinate data of the position designated by the input position designating portion of the written information inputting device is detected by the coordinate data detecting device. The written information storing device stores the coordinate data detected by the coordinate data detecting device that is, designated coordinate data, as a written information unit, and stores the written information unit and the detected sound data in association with each other via the designated coordinate data. Therefore, recording of the sound data can be started and ended with a simple operation. As an input of the written information and an instruction of the recording start or end are individually executed, remaining of meaningless written information only for the recording start or end can be prevented. In addition, as the written information is inputted at a designated position to execute recording, the designated coordinate data can be recognized easily. As a result, searching of the sound data after a long interval can be smoothly made.

In a further aspect of the invention, in the information recording and reproducing apparatus, the written information storing device stores a plurality of sets of the stroke data in association with the sound data via the designated coordinate data. The apparatus further comprises a playback mode selecting device that includes a playback position designating portion for designating a playback position in the input area and that outputs a playback start signal, and a sound data playback device that starts a playback of the sound data stored in the sound data storing device in association with one of the plurality of sets of stroke data via the designated coordinate data for a position designated by the playback position designating portion in response to an output of the playback start signal when the designated coordinate data is determined to be included in a range where the one of the plurality of sets of stroke data belongs, in the input area.

As mentioned above, the sound data, the designated coordinate data, and the stroke data are inputted. If the user designates a position in a predetermined range where the stroke data belongs using the position designating portion of the playback mode selecting device, and a playback start signal is outputted from the playback mode selecting device, coordinate data of the position designated by the playback mode selecting device is detected by the coordinate data detecting device. The detected coordinate data is determined to be included in the predetermined range where the stroke data belongs. Searching of the sound data stored in association with the stroke data via the designated coordinate data is executed. Searched sound data is played back by the sound data playback device. Accordingly, the sound data stored as described above can be reliably and smoothly played back.

In a further aspect of the invention, the written information inputting device uses one end of a pen-type member as the input position designating portion, the recording mode selecting device uses another end of the pen-type member as the recording position designating portion. Therefore, the stroke data is stored simply in such a manner as to write a letter using a pen. The recording mode selecting device uses another end of the pen-type member as the recording position designating portion. Therefore, inputting a recording start signal of the sound data and designating a position to record the sound data are simply done in such a manner as to designate a letter using a pen. As a result, the recording start of the sound data can be instructed smoothly. Further, in various exemplary embodiments the written information inputting device and the recording mode selecting device are realized in one pen-type member, which leads to usability improvements and cost reductions.

In another aspect of the invention, the written information inputting device and the recording mode selecting device share one end of the pen-type member as a position designating portion. Therefore, the stroke data is stored simply in such a manner as to write a letter using a pen. In addition, inputting a recording start signal of the sound data and designating a position to record the sound data are simply done in such a manner as to designate a letter using a pen. Further, as the written information inputting device and the recording mode selecting device are switched selectively via a switching device, the usability can be further improved. As a result, the recording start of the sound data can be instructed smoothly. In addition, the written information inputting device and the recording mode selecting device are realized in one pen-type member, which leads to cost reductions.

In a further preferred aspect of the invention, the written information inputting device and the recording mode selecting device individually use one end of respective pen-type members as a position designating device. Therefore, the stroke data is stored simply in such a manner as to write a letter using a pen. In addition, inputting a recording start signal of the sound data and designating a position to record the sound data are simply done in such a manner as to designate a letter using a separatepen. As a result, the recording start of the sound data can be instructed smoothly.

In another aspect of the invention, when the recording position designating portion makes contact with or is away from a predetermined area, the switch of the recording mode selecting device is switched to on or off in accordance with the state of the recording position designating portion. Therefore, an instruction of the recording start or end can be simply executed.

BRIEF DESCRIPTION OF THE DRAWINGS

The invention will be described in greater detail with reference to exemplary embodiments thereof and the accompanying drawings wherein;

FIG. 6A illustrates handwritten data input in the information recording and reproducing apparatus of FIG. 1;

FIG. 6B is an exemplary structure of sound data storage area;

FIG. 6C illustrates a positional relationship between the handwritten data and coordinate data where the start of recording is issued;

FIG. 6D is another exemplary structure of the address table 600;

FIG. 6E is another exemplary structure of the address table 600;

DESCRIPTION OF THE PREFERRED EMBODIMENTS

One exemplary embodiment of the invention will be described in detail with reference to the accompanying drawings.

Figure 1:
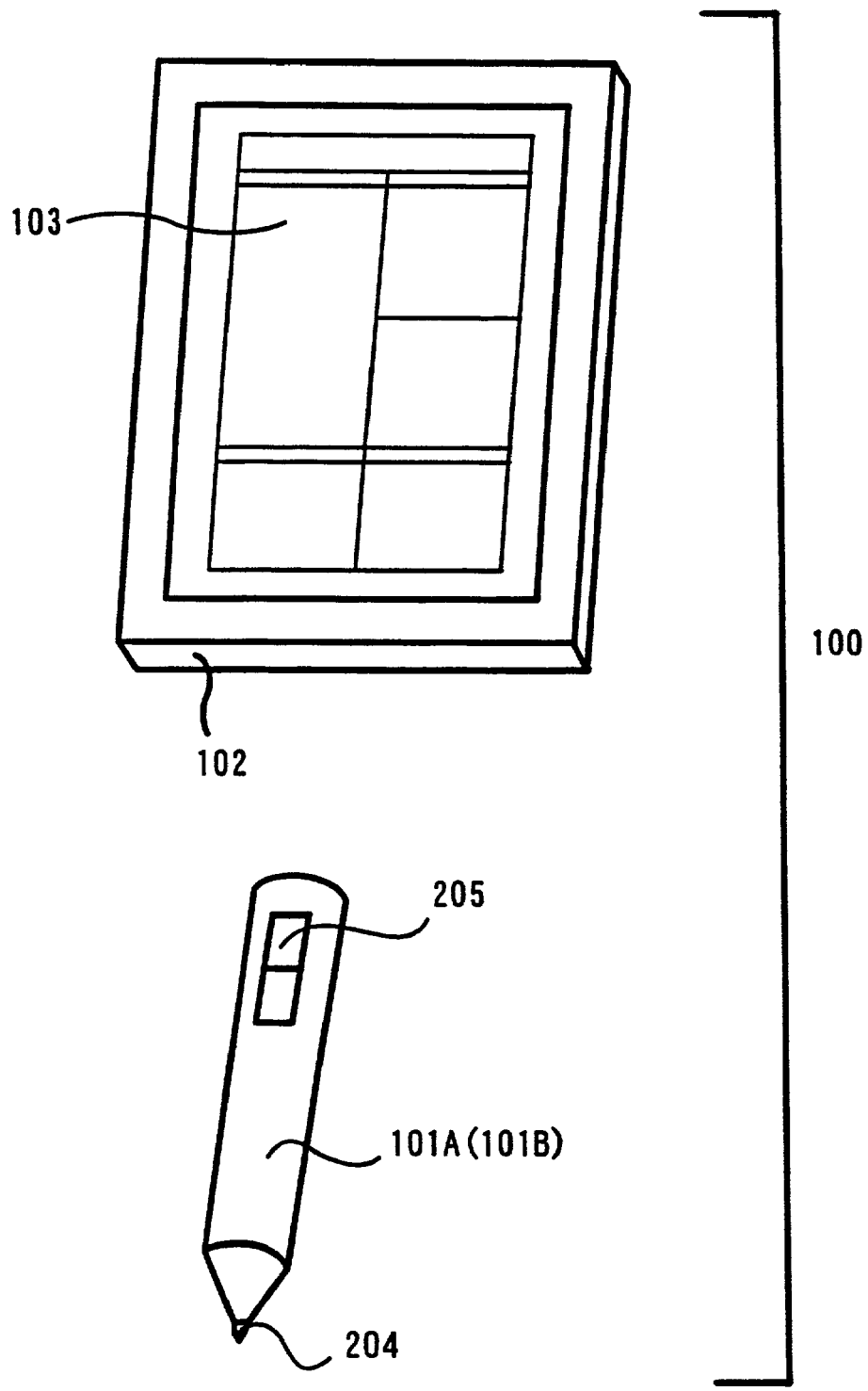
FIG. 1 is a perspective view showing a rough structure of an information recording and reproducing apparatus in a first exemplary embodiment of the invention.

As shown in FIG. 1, an information recording and reproducing apparatus 100 includes a marker 101A, a marker 101B (as will be further discussed below), and an input board 102. The marker 101A and the marker 101B in various exemplary embodiments, are discrete parts, but indicated as one part in FIG. 1 with their respective numerals.

The input board 102 is formed in a board as shown in FIG. 1. A recording sheet 103 is placed on the surface of the input board 102. In various exemplary embodiments, the recording sheet 103 includes an easy-peel-off adhesive on the back of the recording sheet 103. The recording sheet 103 is affixed to the surface of the input board 102 with sufficient adhesion. In other various exemplary embodiments, a regular paper is fixed to the surface of the input board 102 by a fixing device, not shown.

A tip 204 of the marker 101A (101B) outputs a signal, which the frequency is modulated to a predetermined value. The input board 102 functions as a magnetic coupling tablet. Thus, when a user taps the tip 204 of the marker 101A (101B) on the recording sheet 103, coordinate data of a position designated by the tip 204 is stored by the magnetic coupling tablet.

The tip 204 of the marker 101B can be used to write on the regular paper as well as other writing tools such as a pencil, a mechanical pencil, a ball-point pen, and a felt pen. Therefore, letters and marks can be written on the recording sheet 103 using the tip 204.

Further, the marker 101A is provided with a playback/recording switch 205. The marker 101A functions in a playback mode or a recording mode by switching of the playback/recording switch 205. In other various exemplary embodiments, the playback/recording switch 205 is disposed on the input board 102, instead of the marker 101A.

Figure 2:
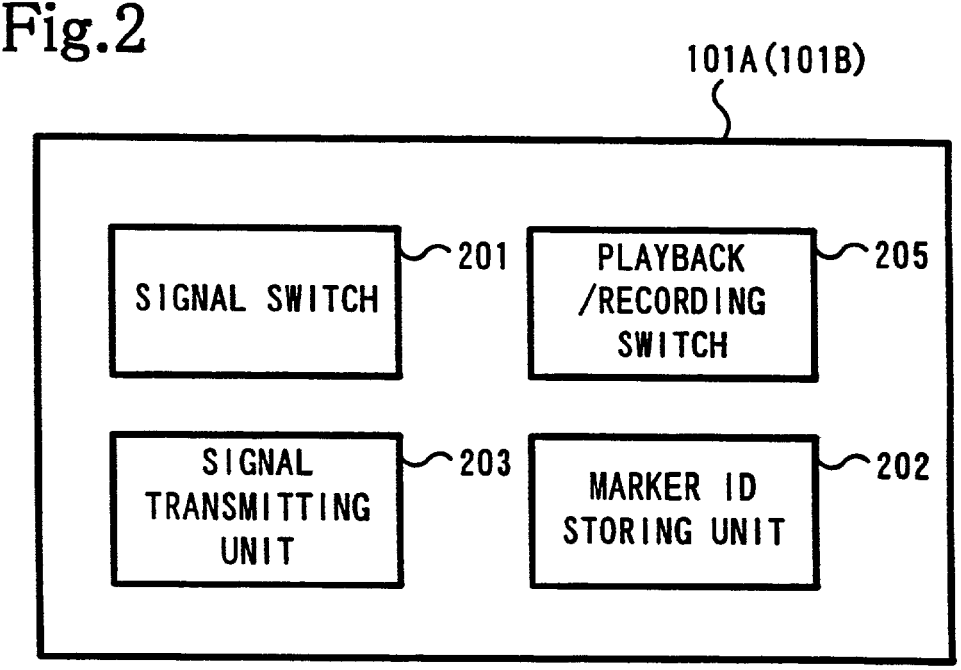
FIG. 2 is a block diagram of a marker in the information recording and reproducing apparatus of FIG. 1.

FIG. 2 shows a structure of the marker 101A (101B). The marker 101A is used to indicate the start and end of a recording, or to indicate the start and end of a playback. The marker 101B is used to input stroke data, which makes up handwritten data. Because the fundamental structure of the marker 101A is common to the marker 101B, the structure is described with reference to one drawing.

As shown in FIG. 2, each of the markers 101A and 101B includes a signal switch 201, a signal transmitting unit 203, and a marker ID storing unit 202.

The signal switch 201 is structured to work with the tip 204 of the marker 101A or 101B. As the tip 204 is moved vertically with minute strokes according to the pressure where the marker is pressed, the switch 201 is switched to on or off. In various exemplary embodiments, the switch 201 is set to on when the tip 204 is pressed against the recording sheet 103, and off when released.

The marker ID storing unit 202 is composed of a memory, and stores ID information of the marker 101A and the marker 101B respectively. The marker ID storing unit 202 of the marker 101A stores ID information when the marker 101A is in the recording mode and ID information when the marker 101A is in the playback mode, separately from each other. In various exemplary embodiments, only one marker 101B is provided for inputting handwritten data. However, other exemplary embodiments include a plurality of different color markers so that they each can store different ID information. In this case, if color information data is stored with coordinate data, the color information data can be reflected in printing and displaying.

In both markers 101A and 101B, when the signal switch 201 is turned on, the signal transmitting unit 203 outputs a frequency-modulated signal, a phase-modulated signal, and/or an amplitude-modulated signal via the tip 204. The frequency, duty, or amplitude of the modulated signals is set differently according to the ID information. The modulation is controlled by a microcontroller, not shown, in accordance with the ID information coded and stored in the memory. Instead of storing the ID information into the memory, a modulation circuit that outputs a signal corresponding to the ID information may be provided in each of the marker 101A and the marker 101B in advance, so that the modulation can take place in response to the ID information. That is, based on the ID information of a mode selected by the switching of the playback/recording switch 205, the marker 101A performs the modulation and outputs a signal corresponding to the selected mode.

Figure 3:
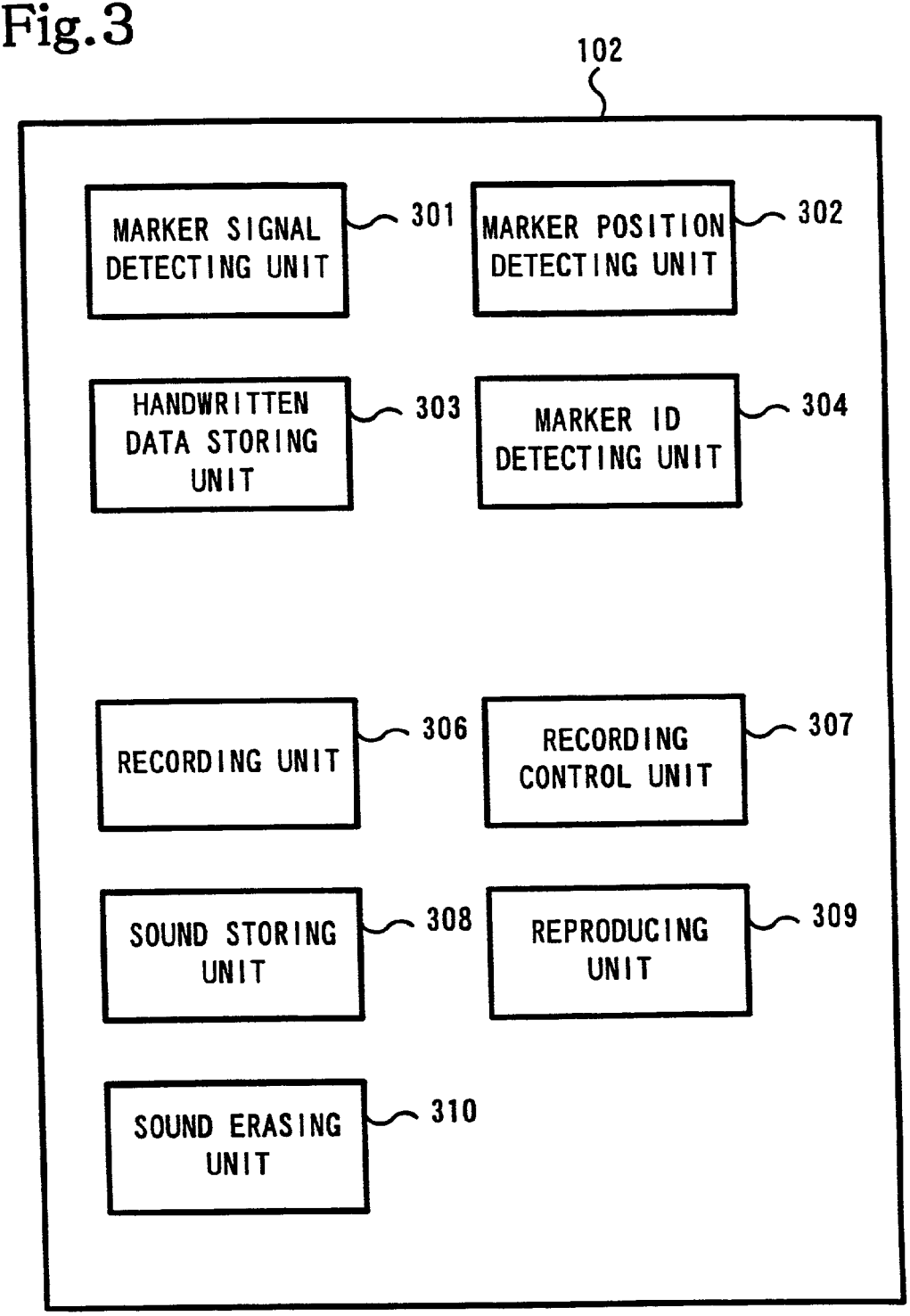
FIG. 3 is a block diagram of an input board in the information recording and reproducing apparatus of FIG. 1.

FIG. 3 is a block diagram of the input board 102. As shown in FIG. 3, the input board 102 includes a marker signal detecting unit 301, a marker position detecting unit 302, a handwritten data storing unit 303, a marker ID detecting unit 304, a recording unit 306, a recording control unit 307, a sound storing unit 308, a reproducing unit 309, and a sound erasing unit 310.

The marker signal detecting unit 301 includes a magnetic coupling tablet, and is made up of magnetic coupling elements disposed in a matrix under the surface where the recording sheet 103 is placed. When each magnetic coupling element detects a signal issued from the marker 101A or 101B, the electromagnetic property of the element varies, which is captured as a change in output. The detection of the signal may be performed at a fixed cycle or continuously for a certain period. Because the marker signal detecting unit 301 is made of magnetic coupling events, it can reliably receive output signals of the marker 101A or 101B via the electromagnet elements even when the recording sheet 103 is placed on the surface of the marker signal detecting unit 301.

The marker position detecting unit 302 includes a tablet driver, and detects the change of the output of the magnetic coupling element as coordinate data.

The marker ID detecting unit 304 includes a CPU, and detects ID information included in an output signal of the marker 101A or 101B. Based on the detection result, the marker ID detecting unit 304 determines which marker is currently being used.

Fundamental structures of the marker 101A, the marker 101B, the marker signal detecting unit 301, the marker position detecting unit 302, and the marker ID detecting unit 304 are realized in similar structures disclosed in U.S. Pat. No. 5,136,125, and commonly owned U.S. patent application Ser. No. 09/636,818 issued as U.S. Pat. No. 6,744,426, Ser. Nos. 09/636,892, 09/659,754 issued as U.S. Pat. No. 6,606,087, Ser. No. 09/628,724 issued as U.S. Pat. Nos. 6,784,876, and Ser. No. 09/634,322 issued as U.S. Pat. No. 6,639,585, the disclosures of which are herein incorporated by reference.

The handwritten data storing unit 303 includes a CPU and a memory. When the ID information detected by the marker ID detecting unit 304 is the ID information included in an output signal of the marker 101A in the recording mode, the coordinate data detected by the marker position detecting unit 302 is stored as designated coordinate data in the memory. When the ID information detected by the marker ID detecting unit 304 is the ID information included in an output signal of the marker 101B, the coordinate data detected by the marker position detecting unit 302 is stored as stroke data in the memory. A trail of the marker 101B made by the user manually drawing on the recording sheet 103 is stored as stroke data, which is data that is a group of coordinate data, in the memory. A collection of the stroke data makes up a string.

Thus, the string is not limited to stroke data, which is obtained from a one-stroke input. For example, when "telephone number of Mr. A" is written on the recording sheet 103 as shown in FIG. 7B, a collection of stroke data corresponding to a trail of each letter of the "telephone number of Mr. A" is regarded as one string. In other words, a collection of stroke data is treated as one string until the amount of the change in either one of the detected coordinate data or the detected time is beyond a predetermined amount. If the predetermined amount is exceeded, the next collection of stroke data is treated as another string. There may be cases where the predetermined amount is exceeded but the coordinate data is not effective because a detection time of an output signal for the coordinate data that makes up new stroke data is too short. In such cases, the coordinate data may not be stored as new stroke data. In various exemplary embodiments, a string constructed as mentioned above is stored as the handwritten data.

The recording unit 306 includes a CPU, an A/D converter, and a compression converter. The recording unit 306 converts sound signals, which are inputted via a microphone (not shown) provided in the input body 102, into digital signals, performs data compression in a predetermined format, and controls the writing of sound data into a memory.

The sound storing unit 308 includes a memory, and stores sound data and time data which are outputted from the recording unit 306.

The recording control unit 307 includes a CPU, and indicates the start and the end of a recording process to the recording unit 306 according to the instruction of the marker 101A in the recording mode. According to the instruction of the marker 101A in the playback mode, the recording control unit 307 controls searching of the sound data, the start of a playback, and the end of the playback.

The reproducing unit 309 includes a D/A converter and a decompression converter, and reproduces sound data stored in the sound storing unit 308 based on the control by the recording control unit 307.

The sound erasing unit 310 includes a CPU, and erases sound data from the memory when the marker 101A by being switched to the recording mode with the playback/recording switch 205, is used in the erase mode. The marker 101A is provided with a selective switch, not shown, that allows switching between the input mode and the erase mode. The marker ID storing unit 202 stores the ID information of the input mode and the ID information of the erase mode in advance. Based on the ID information of a mode selected by the switching of the selective switch, the marker 101A performs the modulation and outputs a signal corresponding to the selected mode, i.e., input or erase. In other various exemplary embodiments, the the selective switch is disposed on the input board 102, rather than the marker 101A. So as to facilitate the setting of the erase mode, the user may designate an area predetermined for the erase mode on the tablet using the marker 101A. Further, the marker 101A may be provided with a sensor that self-recognizes its posture, so that the marker 101A is in the input mode when the marker 101A is in a normal position and in the erase mode when the marker 101A is placed upside down. In various other exemplary embodiments, an eraser or a portion equivalent to the eraser may be provided at the rear end opposite to the tip 204 of the marker 101A, so that the marker 101A is in the erase mode when input is done using the eraser or the portion equivalent to the eraser. In this case, the eraser or the portion equivalent to the eraser includes a switch that is similar to the switch 201 that is activated when the eraser or the portion equivalent to the eraser is pressed against the recording sheet 103. Various exemplary embodiments include a marker that is used only in the erase mode.

In other various exemplary embodiments, the above-mentioned units of the input board 102 do not necessarily have their own respective CPUs and memories. The input board 102 can be structured so that the above-mentioned units are controlled by one CPU and stored in one memory.

A process/method where the sound data is stored will be described with reference to FIGS. 4 and 5.

The method begins at step S41, wherein it is determined whether the recording indication signal is on. When the user switches the playback/recording switch 205 to the recording mode, the marker 101A and the input board 102 are put in the input mode. When the tip 204 of the marker 101A is pressed against the recording sheet 103, the signal switch 201 is turned on, and the signal transmitting unit 203 outputs a signal. When the signal is detected by the marker signal detecting unit 301 of the input board 102 and the ID information of the marker 101A in the recording mode is detected by the marker ID detecting unit 304, the recording control unit 307 determines that a recording indication signal is on and issues an instruction of the start of the recording to the recording unit 306 and a recording process is started at step S42. Otherwise the method loops back to step S41 and continues to determine if the signal is on.

The sound data is stored in a designated storage area by the control of the recording unit 306. In various exemplary embodiments, the sound data may be sampled at a fixed sampling rate, and stored at a fixed transfer rate in a memory divided by a fixed memory capacity.

Figure 5B:
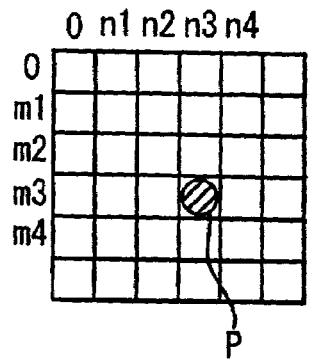
FIG. 5B illustrates a coordinate point where the start of recording is issued.
Figure 5A:
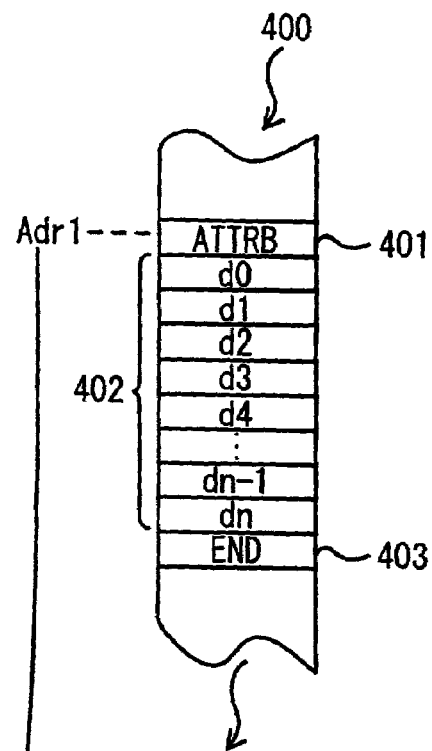
FIG. 5A is an exemplary structure of sound data storage area in the information recording and reproducing apparatus of FIG. 1.

FIG. 5A illustrates a structure of a sound data storage area 400, which is provided in the sound storing unit 308. The storage area 400 includes an attribute data location 401, a sound data location 402, and an end data location 403. The example of FIG. 5A shows a structure of the storage area 400 for one type of sound data. Other types of sound data are stored in a similar structure.

In the attribute data location 401, attribute data is stored. The attribute data describes whether the sound data was stored in the input mode or the erase mode. When the attribute data indicates that the data was stroed in the erase mode, the sound data location 402 can be used again as a storable area.

In the sound data location 402, the sound data that has been digitized and compressed by the recording unit 306 is stored.

In the end data location 403, end data is stored when the storing of the sound data is finished. When the sound data location 402 includes available areas in a discontinuous state, address data indicating a next sound data location 402 may be stored in the end data location 403. In such a structure, the sound data location 402 can be put to the best possible use even if it is used with discontinuous address data as a result of an erasing process.

In the storage area 400, the sound data is stored by the control of the recording unit 306.

The recording control unit 307 performs the storing of the sound data as mentioned above, detects the coordinate data by the marker position detecting unit 302 when the output signal of the marker 101A is detected by the marker signal detecting unit 301, and stores the detected coordinate data as the designated coordinate data. For example, as shown in FIG. 5C, the designated coordinate data is stored in a pointer 404 provided in the sound storing unit 308. This process is also included in step S42, shown in FIG. 4.

As shown in FIG. 5B, assume that a point P on the tablet (coordinate data: (n3, m3)) is indicated by the marker 101A. In this case, the designated coordinate data (n3, m3) is stored in the pointer 404 as shown in FIG. 5C.

The recording control unit 307 stores a first address Adr1 of the sound data storage area 400 in an area of an address table 600, which is associated with the coordinates the pointer 404 indicates. For example, the address table 600 of FIG. 5C is provided in the sound storing unit 308.

The table 600 includes an address location 601 indicating addresses in a handwritten data storage area 410 (see FIG. 6B) and an address location 602 indicating addresses in the sound data storage area 400. Each of the address locations 601, 602 has a plurality of storage areas, each of which corresponds to each of the coordinates that can be designated on the tablet.

Therefore, in FIG. 5C, the first address Adr1 of the sound data stored in the storage area is stored in an area of the address location 602, which is associated with the coordinate data (n3, m3) the pointer 404 stores. In a blank area of the address table 600 of FIG. 5C, data except for effective address data, such as 00, is stored.

As mentioned above, the designated coordinate data and the sound data to be stored are associated with each other. The process is also included in the recording start process of step S42 shown in FIG. 4.

Figure 4:
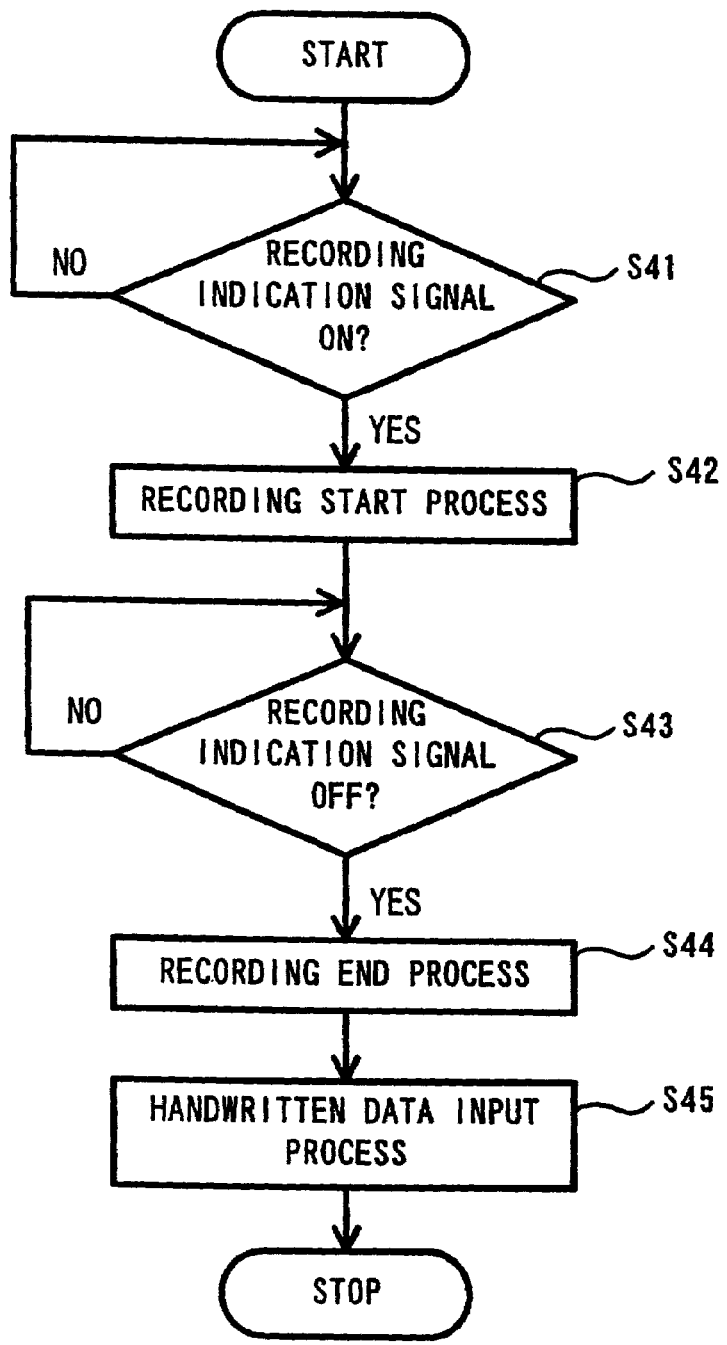
FIG. 4 is a flowchart for recording in the information recording and reproducing apparatus of FIG. 1.
Figure 5C:
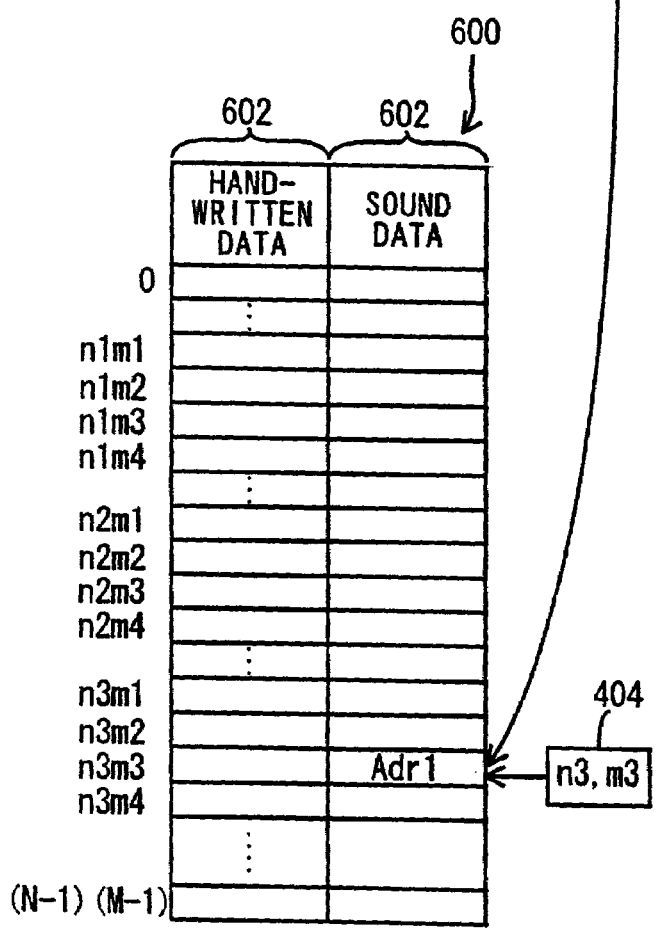
FIG. 5C is an exemplary structure of a table 600.

After the recording process is started, the method proceeds to step S43 as shown in FIG. 4, wherein it is determined whether the recording indication signal is off. When the user releases the marker 101A from the recording sheet 103, the signal switch 201 is turned off and the signal transmitting unit 203 outputs a signal indicating the end of the recording.

When the signal is detected by the marker signal detecting unit 301 of the input board 102 and the ID information of the marker 101A, which is switched to the recording mode, is detected by the marker ID detecting unit 304, the recording control unit 307 determines that the recording indication signal is off. The recording control unit 307 issues to the recording unit 306 an instruction to end recording, and the recording end process is performed at step S44. Otherwise, the method returns to step S43.

Specifically, the output of the sound data from the recording unit 306 to the storage area 400 is stopped, and the end data is stored in the end data location 403 of the storage area 400.

At step S45, an input process of the handwritten data is performed. The handwritten data input process is described with reference to FIGS. 4 and 6.

The input process is started when the user uses the marker 101B instead of the marker 101A and inputs the information representing letters or symbols on the recording sheet 103 as shown in FIG. 6A.

In other words, when the user starts writing handwritten data by pressing and moving the marker 101B against the recording sheet 103 as shown in FIG. 6A, the tip 204 of the marker 101B is pressed, the switch 201 is turned on, and the signal transmitting unit 203 outputs a signal. When the signal is detected by the marker signal detecting unit 301 of the input board 102 and the ID information of the marker 101B is detected by the marker ID detecting unit 304, the handwritten data storing unit 303 stores the coordinated data found by the marker position detecting unit 302 in the memory.

FIG. 6B illustrates a structure of a handwritten data storage area 410. The storage area 410 includes an attribute data location 411, a coordinate data location 412, and an end data location 413.

In the attribute data location 411, attribute data is stored. The attribute data describes an attribute of a past event related to the data. For example, the attribute data may indicate that the stored coordinate data was stored during an input mode or an erase mode.

In the coordinate data location 412, stored is the coordinate data of the tip 204 of the marker 101B sampled every $\Delta t$ seconds by the marker position detecting unit 302.

Assuming that, as shown in FIG. 6A, the coordinate data at time T is (x0, y0), the coordinate data at time T+$\Delta t$ is (x1, y1), and the coordinate data at time T+n$\Delta t$ is (xn, yn). The x coordinate data and the y coordinate data are stored in the order as shown in FIG. 6B.

In the end data location 413, end data is stored. The end data indicates the end of a series of coordinate data. Therefore, a group of coordinate data that is delimited with the end data is recognized as a group of coordinate data that makes up the handwritten data of a string. A value that does not exist as the coordinate data is used for the end data. For example, a value greater than the maximum value of the coordinates or less than the minimum value of the coordinates is used.

When the handwritten data of a string, which has already been inputted on the recording sheet 103, is deleted, the handwritten data is overwritten in the erase mode. As is the case with the marker 101A, the marker 101B is also provided with a selective switch that allows switching between the input mode and the erase mode. Switching to the erase mode is made via the switch. In other various exemplary embodiments, the tablet may include the switch for switching between modes for the marker 101B. To facilitate the setting of the erase mode, the user may designate an area predetermined for the erase mode on the tablet using the marker 101B. Further, the marker 101B may be provided with a sensor that self-recognizes its posture, so that the marker 101B is in the input mode when the marker 101B is in a normal position and in the erase mode when the marker 101B is placed upside down. An eraser or a portion equivalent to the eraser may be provided at the rear end opposite to the tip 204 of the marker 101B, so that the marker 101B is in the erase mode when there is input using the eraser or the portion equivalent to the eraser. In this case, the eraser or the portion equivalent to the eraser includes a switch that is similar to the switch 201 that is activated when the eraser or the portion equivalent to the eraser is pressed against the recording sheet 103. Various exemplary embodiments include a marker that is only used in the erase mode.

When an input is made in the erase mode, data indicating an attribute of deletion is stored in the attribute data location 411. For example, in various exemplary embodiments, a "0" is stored in the attribute data location 411 to indicate that the data was entered using a normal input mode, and a "1" is stored in the attribute data location 411 to indicate a data attribute of an erase mode input.

A determination as to whether an input is completed is based on a new input within a certain period of time, an indication by the marker 101B at a predetermined area on the tablet, or switching of the switch provided in the marker 101B. When the completion of the input is recognized, the end data is stored in the end data location 413.

When the input is completed as mentioned above, the handwritten data storing unit 303 stores a first address of the handwritten data storage area 410 in an address location 601 of the address table 600.

In FIG. 6C, the handwritten data W includes coordinate data (n1, m2), (n1, m3), (n2, m3), and (n3, m2). Thus, as shown in FIG. 6D, Adr2, which is a first address of the handwritten data storage area 410, is stored in areas corresponding to the coordinate data of the handwritten data W, in the address location 601 of the address table 600.

The handwritten data storing unit 303 determines a positional relationship between the handwritten data and the designated coordinate data based on the coordinates, and calculates an effective range as an designated area for a playback. For example, a point of the designated coordinate data is assumed to be at a center. Relative to the center, four coordinate points are calculated, each being the greatest in each of the positive and negative directions of the x-axis and the y-axis of the handwritten data. The four coordinate points define a rectangular area. The rectangular area is regarded as the designated area for the playback.

In FIG. 6C, the designated coordinate data P (n3, m3) is the center, and in the handwritten data W, the coordinate data of (n1, m3) is the greatest in the negative direction of the x-axis, and (n3, m2) is the greatest in the positive direction of the y-axis. In this case, a rectangular area defined with the coordinate data (n1, m2), (n1, m3), (n3, m2), and (n3, m3) can be set as the designated area. In this exemplary embodiment, to facilitate the setting of desired handwritten data even if the designated position is deviated to some degree, a rectangular area, which is the diagonally shaded areas in FIG. 6C defined by coordinate data (n1, m1), (n1, m4), (n1, m4), and (n4, m1), is regarded as the designated area for the playback.

The handwritten data storing unit 303 updates the contents of the handwritten data address location 601 in accordance with the designated area established as mentioned above. In the above example, to associate all of coordinate data included in the designated area indicated with the oblique lines in FIG. 6C, the first address Adr2 is copied as shown in FIG. 6E.

Similarly, the handwritten data storing unit 303 updates the contents of the sound data address location 602 in accordance with all coordinate data included in the designated area. In the above example, to associate all of coordinate data included in the designated area indicated with the oblique lines in FIG. 6C, the first address Adr1 is copied as shown in FIG. 6E.

As mentioned above, the handwritten data input process includes the storing of the handwritten data and the creation of the address table 600. After step S45, the method stops as shown in FIG. 4.

At a stage where the aforementioned processes are completed, there may be written information such as "telephone number of Mr. A" on the recording sheet 103 as shown in FIG. 7B, and the handwritten data associated with the written information is stored in the memory. The sound data is stored in the memory during the period where the user presses the marker 101A on the recording sheet 103.

Figure 7A:
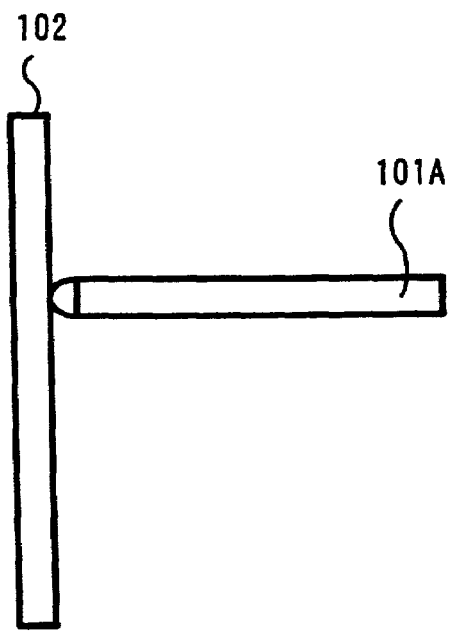
FIG. 7A is a side view showing an indication of playback in the information recording and reproducing apparatus of FIG. 1.
Figure 7B:
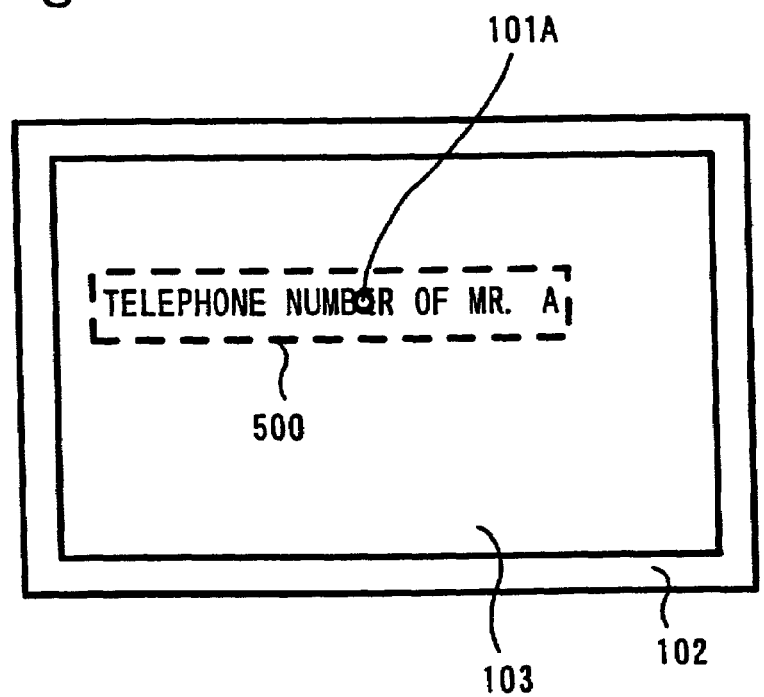
FIG. 7B is a plan view of FIG. 7A.

For example, after a telephone is on-hook, the user sets the marker 101A to the playback mode via the playback/recording switch 205, and selects a position within a designated area 500 using the marker 101A as shown in FIGS. 7(A) and 7(B). Under this condition, the sound data can be played back.

Figure 8:
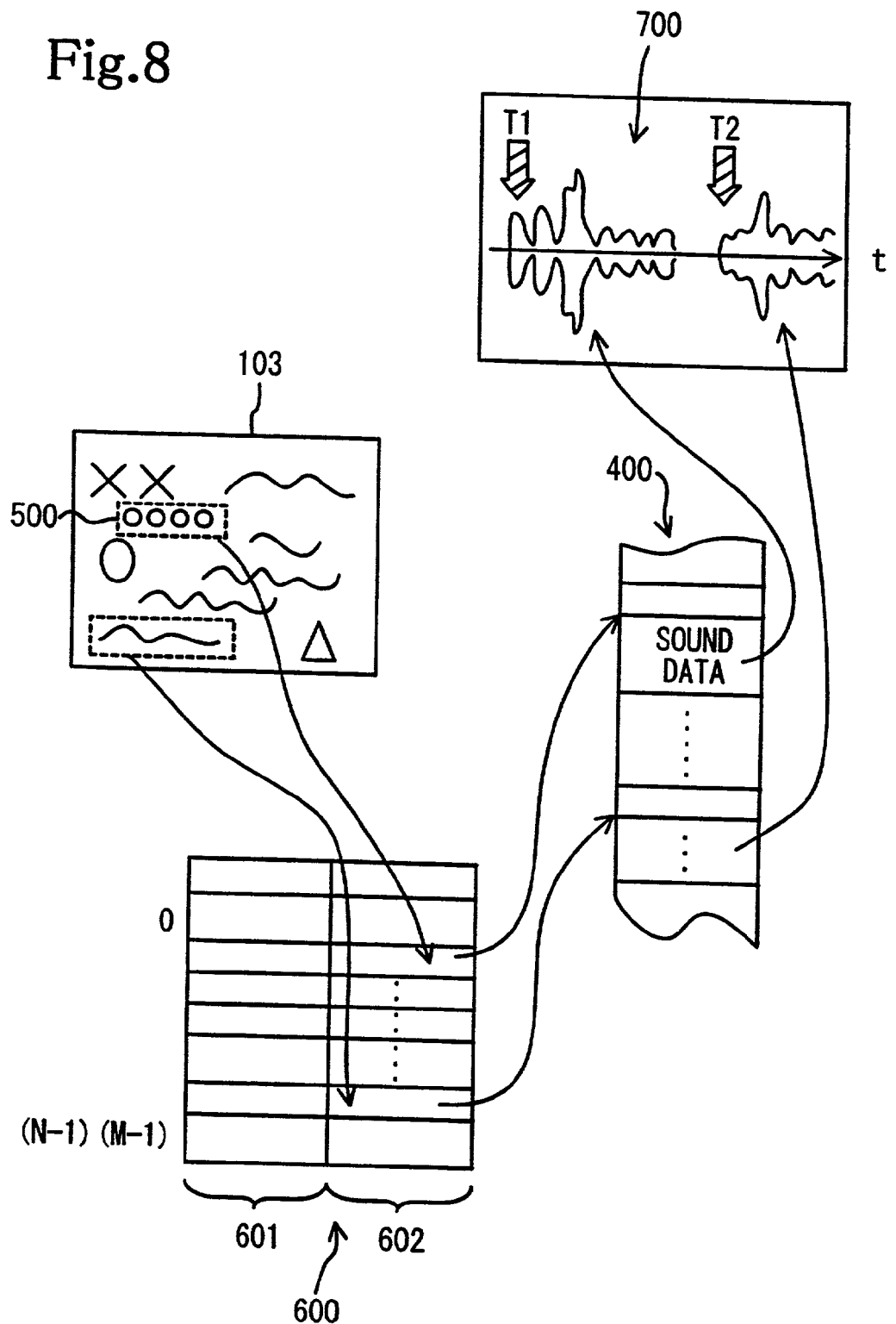
FIG. 8 illustrates an exemplary playback process in the information recording and reproducing apparatus of FIG. 1.

In other words, when the user presses the marker 101A in the playback mode as shown in FIGS. 7(A) and 7(B) against a certain position within the designated area 500, the tip 204 of the marker 101A is pressed, the switch 201 is turned on, and the signal transmitting unit 203 outputs a signal. When the signal is detected by the marker signal detecting unit 301 of the input board 102 and the ID information of the marker 101A in the playback mode is detected by the marker ID detecting unit 304, the recording control unit 307 refers to the address table 600 based on the coordinate data detected by the marker position detecting unit 302 as shown in FIG. 8. The recording control unit 307 obtains content of the address location 602 associated with the coordinate data, that is, an address of the sound data storage area 400. Further, the recording control unit 307 issues an instruction of playback start to the reproducing unit 309 and outputs the obtained address of the sound data storage area 400. Thus, as shown in FIG. 8, sound data 700 is played back by the reproducing unit 309.

In the example of FIG. 6, if the coordinates designated by the marker 101A in the playback mode are (n2, m2), content associated with the coordinates (n2, m2) is referred in the sound data address location 602 of the address table 600. The content is address Adr1 as shown in FIG. 6E. As a result, as shown in FIG. 5A, the sound data of the storage area 400 that is indicated by the address Adr1 is referred and played back.

As mentioned above, in various exemplary embodiments, the user can make a recording by designating a point on the input board 102 using the marker 101A. Therefore, the recording can be reliably made even when it is immediately required. Furthermore, the recording period can be adjusted easily according to a length of time that the marker 10A is pressed. No meaningless letters, characters, and symbols remain after the recording process, because pressing the marker 101A against the recording sheet 103 is all that is needed to start the recording process. After the recording, the written information that the user recognizes can be associated with the point where the marker 101A is pressed. Therefore, recorded sound can be played back by designating the written information with the marker 101A. Even when time passes long after a recording, the recording can be played back reliably regardless of the length of time elapsed after the recording. As the written information can be freely input, the contents of the recording can be described concretely, so that the user can remember the recorded contents later.

Figure 9:
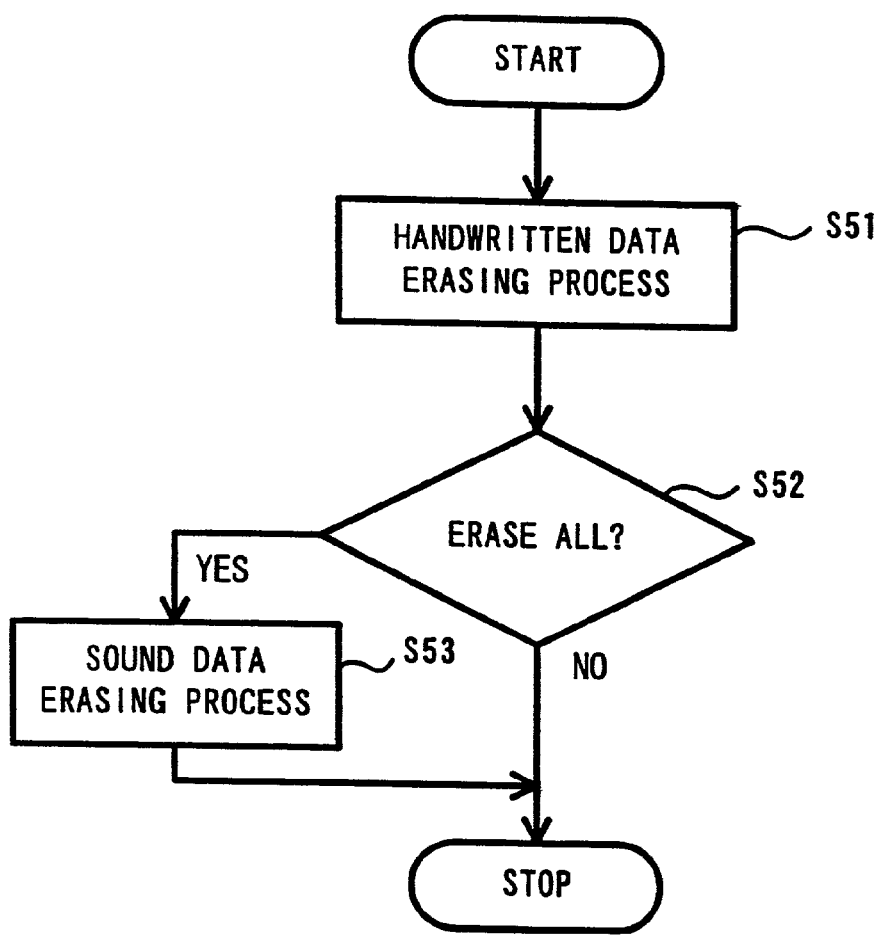
FIG. 9 is a flowchart of an exemplary erasing process in a second exemplary embodiment of the invention.

Next, a second exemplary embodiment of the invention will be described with reference to the method shown in FIG. 9. Parts in common with the first exemplary embodiment are indicated with the same numerals, and their descriptions are omitted for clarity.

This embodiment shows an example for erasing the handwritten data and the sound data. The method begins at step S51, wherein the process of erasing the handwritten data is activated. The marker 101B is provided with a selective switch that allows switching between the input mode and the erase mode. The marker ID storing unit 202 stores the ID information of the input mode and the ID information of the erase mode in advance. Based on the ID information of a mode selected by the switching of the selective switch, the marker 101B performs the modulation and outputs a signal corresponding to the selected mode. In other exemplary embodiments, the selective switch may be disposed in or on the input board 102 rather than the marker 101B. To facilitate the setting of the erase mode, the user may designate an area predetermined for the erase mode on the tablet using the marker 101B.

Suppose that the user uses the marker 101B in the erase mode and draws two lines or an x mark on some handwritten data already input on the recording sheet 103. The user can freely draw lines and marks. Whatever handwritten data the user inputs, when the marker 101B in the erase mode is pressed anywhere in the designated area 500, the tip 204 of the marker 101B is pressed, the switch 201 is turned on, and a signal is issued from the signal transmitting unit 203. When the signal is detected by the marker signal detecting unit 301 of the input board 102 and the ID information of the marker 101B in the erase mode is detected by the marker ID detecting unit 304, the sound erasing unit 310 refers to the address table 600 of FIG. 6 based on the coordinate data detected by the marker position detecting unit 302. Then the sound erasing unit 310 obtains content of the address location 601, which is associated with the coordinate data, that is, an address of the handwritten data storage area 410.

For example, if the handwritten data W of FIG. 6C is erased. The sound erasing unit 310 refers to the address location 601 of the address table 600, and obtains the address Adr2.

At step S52 the sound erasing unit 310 determines whether the erase process is for erasing all of the handwritten data. The determination may be made based on a stroke length of the marker 101B or by designating a predetermined area on the tablet for an erase all instruction.

When erasing of all of the handwritten data is not selected, then the erasing of the sound data is not executed. In various exemplary embodiments, the apparatus of the invention is used for taking notes on the recording sheet 103, wherein an erasing process to erase the handwritten data cannot be executed. However, for example, when the apparatus of this invention is applied to a whiteboard or the like, there are cases that a process of printing written data may be performed. Therefore, in this case, the handwritten data may be erased when erasing all the handwritten data is not selected.

If the handwritten data W of FIG. 6 (C) is inputted in a whiteboard-type information recording and reproducing apparatus and some of the data W is erased using the marker 101B of an eraser type, the data process is as follows. Based on the address Adr2 obtained, the storage area 410 of FIG. 6B is referred, and data associated with a position that the marker 101B erases and a stroke length thereof is erased from the coordinate data location 412. In this case, a value that is impossible as the coordinate data may be stored.

If in step S52 it is determined that erasing of all handwritten data is selected, then the method proceeds to step S53, wherein the sound data erasing process is activated. The sound erasing unit 310 refers to the address table 600 of FIG. 6 based on the coordinate data detected by the marker position detecting unit 302. Then, the sound erasing unit 310 obtains content of the address location 602, which is associated with the coordinate data, that is, an address of the sound data storage area 400. Further, the attribute data indicating that erasing process is executed is stored in the attribute data location 401 of the storage area 400 that the obtained address indicates.

When all of the handwritten data W of FIG. 6C is erased, the sound erasing unit 310 refers to the address location 602 of the address table 600 shown in FIG. 6E, and obtains the address Adr1. As shown in FIG. 5A, the attribute data indicates that the erasing process has been executed and is stored in the attribute data location 401 that the address Adr1 indicates. As a result, the sound data location 402 is handled as an area capable of storing new sound data, making effective use of the storage area.

For the whiteboard-type application, if erasing of all handwritten data is selected, the attribute data that indicates the erasing process has been executed is further stored in the attribute data location 411 of the handwritten data storage area 410. In this way, the contents of the coordinate data location 412 are cleared, and the coordinate data location 412 is in a state where new handwritten data can be stored.

Because it is easy to erase the handwritten data and the sound data, the storage areas can be used effectively.

In the embodiments, the magnetic coupling tablet is used to detect the coordinate data. However, the invention is not limited to such a tablet. An ultrasonic tablet or a touch panel may be used.

The embodiments describe an example of drawing strings on the recording sheet. However, the invention is not limited to such an arrangement. The invention may include a displaying unit such as a liquid crystal display on which strings can be drawn.

In the above embodiments, the marker for storing the handwritten data and the marker for indicating playback/recording of the sound data are separately provided. The invention is not limited to such an arrangement. The functions provided in both markers may be integrated into one marker. In this case, such a marker may be provided with a switch for switching the functions. Instead of the switch, the functions of one marker may be switched by designating a certain area on the tablet or the touch panel. An end of one marker may be used for storing the handwritten data and another end may be used for indicating playback/recording of the sound data. In this case, inputting the handwritten data can be simply done in such a manner to write a letter using a pen. When the playback mode is activated via a mode switching device, inputting a playback start signal of the sound data and designating a position to play back the sound data are simply done in such a manner as to designate a letter using a pen. Similarly, when the recording mode is activated via the mode switching device, inputting a recording start signal of the sound data and designating a position to record the sound data are simply done in such a manner as to designate a letter using a pen. As a result, the recording start and the playback start of the sound data can be smoothly instructed. In addition, integration of the markers into one marker can provide cost reductions.

In the above embodiments, recording is started when the marker, in the recording mode, is pressed against the recording sheet and is finished when released. The invention is not limited to such an arrangement. The marker may be provided with an on-off switch that controls the recording operation.

In the above embodiments, an address table is used to link data. The invention is not limited to such an arrangement. Other methods may be used. Even when such a table is used, various addressing may be available. For example, the address data does not have to be directly stored as mentioned above, but rather an address of the pointer indicating the position of the address data can be stored.

It should be understood that the invention is not limited in its application to the details of structure and arrangement of parts illustrated in the accompanying drawings. The invention is capable of other embodiments and of being practiced or performed in various ways without departing from the technical idea thereof, based on existing and well-known techniques among those skilled in the art.

What is claimed is:

1. An information recording and reproducing apparatus, comprising:
    a recording mode selecting device that includes a recording position designating portion for designating a certain position in an input area;
    a recording switch that outputs a recording start signal and a recording end signal of sound data in response to a switching of the switch in response to the recording position designating portion indicating that the certain position is within a certain area of the input area;
    a coordinate on data detecting device that detects coordinate data of the certain position in the input area designated by the position designating portion;
    a designated coordinate data storing device that stores the coordinate data detected by the coordinate data detecting device as designated coordinate data;
    a written information inputting device that includes an input position designating portion for inputting written information by designating the certain position in the input area, wherein the coordinate data detecting device detects coordinate data of a position designated by the position designating portion of the written information inputting device, wherein the written information inputting device further includes an erase designating portion for erasing the written information by designating the certain position in the input area;

a sound data storing device that starts recording the sound data in association with the designated coordinate data in response to an output of the recording start signal and that ends recording in response to an output of the recording end signal; and a sound data erasing device that erases the sound data from the sound data storage device if all of the written information is erased from the input area.

2. The information recording and reproducing apparatus according to claim 1, further comprising:

a written information storing device that stores the coordinate data of the written information inputting device as stroke data in association with the sound data by the designated coordinate data.

3. The information recording and reproducing apparatus according to claim 2, wherein the written information storing device stores a plurality of sets of the stroke data in association with the sound data via the designated coordinate data, the apparatus further comprises:

a playback mode selecting device that includes a playback position designating portion for designating a playback position in the input area and that outputs a playback start signal; and a sound data playback device that starts a playback of the sound data stored in the sound data storing device in association with one of the plurality of sets of stroke data via the designated coordinate data for a position designated by the playback position designating portion in response to an output of the playback start signal when the designated coordinate data is determined to be included in a range of the input area where the one of the plurality of sets of stroke data belongs.

4. The information recording and reproducing apparatus according to claim 3, wherein the written information inputting device uses one end of a pen-type member as the input position designating portion, and the recording mode selecting device uses another end of the pen-type member as the recording designating portion.

5. The information recording and reproducing apparatus according to claim 3, wherein the written information inputting device and the recording mode selecting device share one end of a pen-type member as a common position designating portion and the pen-type member is provided with a switching device that selects a function of the pen-type member between the written information inputting device and the recording mode selecting device.

6. The information recording and reproducing apparatus according to claim 3, wherein the written information inputting device and the recording mode selecting device individually use one end of respective pen-type members as the input position designating portion and the recording position designating portion, respectively.

7. The information recording and reproducing apparatus according to claim 3, wherein the recording switch is an on-off switch that is activated by the recording position designating portion making contact with the input area.

8. A storage medium storing an information recording and reproducing program that can be read by a computer, the program comprising:

a coordinate data detecting routine detecting coordinate data of a designated position on an input area designated by a recording position designating portion of a recording mode selecting device that outputs at least one of a recording start signal and a recording end signal of sound data by switching of a switch in response to the recording position designating portion indicating that the certain position is within a certain area of the input area;

a designated coordinate data storing routine storing the coordinate data detected by the coordinate data detecting routine as designated coordinate data;

a sound data storing routine starting recording of the sound data in association with the designated coordinate data in response to an output of the recording start signal, and ending recording in response to an output of the recording end signal;

an erasing detecting routine detecting coordinate data of a designated position on the input area designated by an erasure position designating portion of an erasing mode selecting device that outputs an erasing start signal by switching the switch; and a sound data erasing routine erasing the sound data from the sound data storage routine if all of the written information is erased from the input area.

9. The storage medium according to claim 8, wherein the coordinate data detecting routine that further detects coordinate data of a position designated by an input position designating portion of a written information inputting device; the program further comprises a written information storing routine that stores the coordinate data of the position designated by the written information inputting device as stroke data in association with the sound data using the designated coordinate data.

10. The storage medium according to claim 9, wherein the written information storing routine stores a plurality of sets of the stroke data in association with the sound data using the designated coordinate data; and the program further comprises a sound data playback routine that starts a playback of the sound data stored in association with one of the plurality of sets of the stroke data by the designated coordinate data for a position designated by a playback position designating portion of the recording mode selecting device in response to an output of a playback start signal when the designated coordinate data is determined to be included in a range of the input area where the one of the plurality of sets of the stroke data belongs.

11. The information recording and reproducing apparatus according to claim 1, wherein the recording switch is disposed on the recording mode selecting device.

12. The information recording and reproducing apparatus according to claim 1, wherein the recording switch is disposed on the input area.

* * * * *